No. 707,668. Patented Aug. 26, 1902.
W. H. WRIGHT.
GATE.
(Application filed Jan. 14, 1902.)
(No Model.)
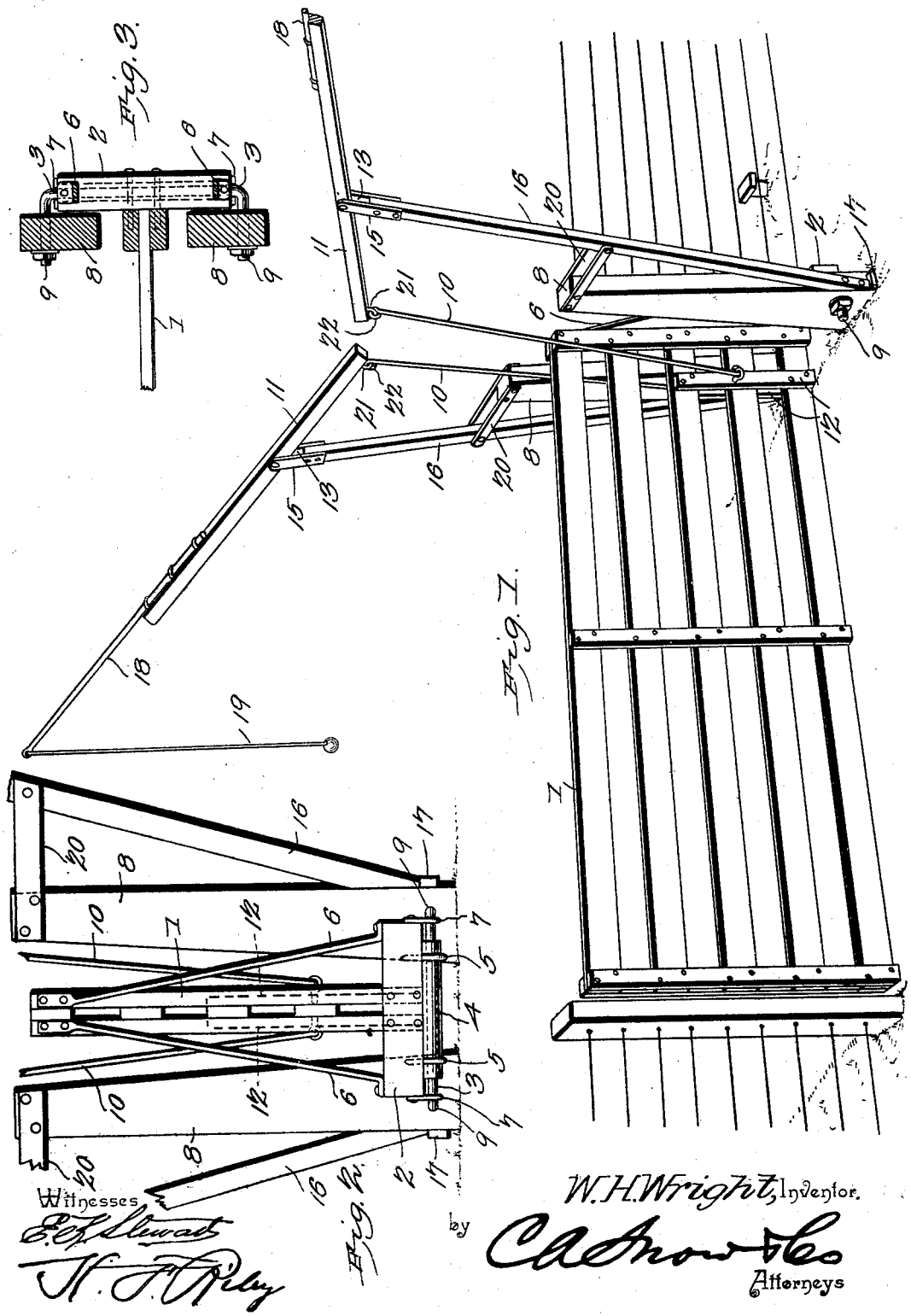

UNITED STATES PATENT OFFICE.

WILLIAM H. WRIGHT, OF CADIZ, OHIO.

GATE.

SPECIFICATION forming part of Letters Patent No. 707,668, dated August 26, 1902.

Application filed January 14, 1902. Serial No. 89,694. (No model.)

*To all whom it may concern:*

Be it known that I, WILLIAM H. WRIGHT, a citizen of the United States, residing at Cadiz, in the county of Harrison and State of Ohio, have invented a new and useful Gate, of which the following is a specification.

The invention relates to improvements in gates.

The object of the present invention is to improve the construction of tilting gates and to provide a simple and comparatively inexpensive one capable of being readily operated at a distance from either side of it and adapted also to have the supports for the pivot of the gate arranged sufficiently close to the latter to prevent the passage of small animals.

The invention consists in the construction and novel combination and arrangement of parts, hereinafter fully described, illustrated in the accompanying drawings, and pointed out in the claims hereto appended.

In the drawings, Figure 1 is a perspective of a tilting gate constructed in accordance with this invention. Fig. 2 is a rear elevation of a portion of the gate, illustrating the manner of mounting the same. Fig. 3 is a horizontal sectional view of the same.

Like numerals of reference designate corresponding parts in all the figures of the drawings.

1 designates a tilting gate composed of horizontal rails and vertical bars; but the gate may be constructed in any other desired manner, and it is provided at its rear end with a transverse bottom bar 2, having suitable bearings for the reception of a horizontal pivot or pintle 3. The pintle or pivot passes through a tubular bearing 4, consisting, preferably, of a piece of pipe secured by staples 5 or other suitable fastening devices to the lower face of the transverse bottom bar or block 2. The transverse bottom bar or block 2, which is supported by inclined braces 6, is also provided at its ends with staples 7 or other suitable devices, which form eyes or bearings for the pintle or pivot rod. The inclined braces 6 extend upward from the outer ends of the arms formed by the block or bar 2 to the top of the gate, and they are suitably secured to the block or bar and to the gate. The block or bar extends beyond the inner edges of a pair of posts 8, which are arranged sufficiently close to the gate to prevent the passage of small animals, and the ends of the transverse pivot or pintle are bent at right angles to form arms 9, which are extended through the posts 8 and which have their terminals threaded for the reception of nuts located at the front faces of the posts. The arms of the pivot or pintle serve as a tie for connecting the uprights or posts to prevent the same from spreading, and by arranging the parts in this manner the posts are brought close to the sides of the gate. Also the bearing prevents any wear of the block or bar 2, and the friction may, if desired, be further reduced by the employment of any antifriction devices, such as balls or rollers. The posts are tapered at their inner sides to provide a sufficient space for rods 10, which connect the gate with operating-levers 11 and which are connected to the gate a sufficient distance in advance of the pivot of the gate to enable the latter to be readily lifted. The gate is provided at opposite sides with short vertical bars 12, and the lifting or connecting rods 10 are hinged to the bars by being linked into suitable eyes thereof. The upper ends of the rods are linked into suitable eyes of the operating-levers, which are fulcrumed in openings or slots 13, formed by short bars or pieces 15, which are secured to the upper ends of inclined fulcrum-bars 16, diverging upwardly and secured at their lower ends to the outer edges of the posts 8 and fitting against blocks 17 thereof. The operating-levers have weighted outer arms or portions adapted to counterbalance the weight of the gate, and they may be provided with extensions 18, from which depend suitable handle-rods 19; but any other means may be employed for enabling the levers to be readily operated. The inclined fulcrum-bars are connected with the tops of the posts by short horizontal bars or braces 20, secured to the front and rear faces of the posts and the fulcrum-bars. The inner ends of the operating-levers are provided with eyes 21, and the upper ends of the rods are provided with hooks 22, which engage the eyes of the operating-levers.

It will be seen that the gate is exceedingly simple and inexpensive in construction and that when the operating-levers are pulled upon it will be swung from a horizontal position to an upright position.

What I claim is—

1. The combination of a tilting gate, posts located at opposite sides of the gate and arranged adjacent to the same, a transverse block or bar secured to the rear end of the gate and arranged in rear of the posts and provided with bearings, a pintle-rod located in rear of the posts and arranged in the bearings and secured to and connecting the said posts, and means for operating the gate, substantially as described.

2. The combination of a tilting gate, the tapered posts located at opposite sides of the gate and arranged close to the same, the transverse block or bar secured to the gate at the bottom thereof and located in rear of the posts and provided with bearings, a pintle-rod arranged in the bearings and provided at its ends with arms secured to the posts, inclined fulcrum-bars extending upward from the outer sides of the posts and connected with the same at the upper portions thereof, operating-levers fulcrumed on the fulcrum-bars, and rods connecting the inner ends of the operating-levers with the gate, substantially as described.

In testimony that I claim the foregoing as my own I have hereto affixed my signature in the presence of two witnesses.

WILLIAM H. WRIGHT.

Witnesses:
CHARLES S. MEALEY,
LEWIS DECKER.